United States Patent
Garnier et al.

(10) Patent No.: US 6,874,578 B1
(45) Date of Patent: Apr. 5, 2005

(54) CEMENTING COMPOSITIONS AND APPLICATION OF SUCH COMPOSITIONS TO CEMENTING OIL WELLS OR THE LIKE

(75) Inventors: Andre Garnier, New Orleans, LA (US); Slaheddine Kefi, Sugar Land, TX (US); Pierre Maroy, Buc (FR); Joachim Schulz, deceased, late of Versailles (FR); by Anne-Marie Schulz, legal representative, Versailles (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/914,331

(22) PCT Filed: Feb. 16, 2000

(86) PCT No.: PCT/EP00/01246

§ 371 (c)(1),
(2), (4) Date: Sep. 18, 2002

(87) PCT Pub. No.: WO00/50357

PCT Pub. Date: Aug. 31, 2000

(30) Foreign Application Priority Data

Feb. 25, 1999 (FR) .......................................... 99 02603

(51) Int. Cl.$^7$ ............................................... E21B 33/13
(52) U.S. Cl. ...................................... 166/293; 166/309
(58) Field of Search .............................. 166/292–295, 166/309; 106/605, 606, 608

(56) References Cited

U.S. PATENT DOCUMENTS

| 5,484,019 A | * | 1/1996 | Griffith | ........................ 166/293 |
| 5,696,059 A | * | 12/1997 | Onan et al. | ................. 507/269 |
| 6,060,535 A | * | 5/2000 | Villar et al. | ................. 166/293 |

* cited by examiner

Primary Examiner—Zakiya Walker
(74) Attorney, Agent, or Firm—Thomas U. Mitchell; Robin Nava; Brigitte L. Echols

(57) ABSTRACT

Method of well cementing with a foamed slurry having a very low water content. When based on ordinary cement, the solid fraction of the slurry includes (by volume) 20–35% Portland cement, 35–65% particles ranging from 200 μm to 600 μm, and 5% to 25% of fine particles in the range 0.5 μm to 5 μm and the water content is less than 50% by volume. When based on micro-cement, the solid fraction includes (by volume) 50–75% micro-cement, 15–40% fine particles in the range 0.5 μm to 5 μm, and 0–20% particles in the rang 3 nanometers to 60 nanometers and the water content is less than 72% by volume.

12 Claims, No Drawings

CEMENTING COMPOSITIONS AND APPLICATION OF SUCH COMPOSITIONS TO CEMENTING OIL WELLS OR THE LIKE

BACKGROUND OF THE INVENTION

The present invention relates to cementing techniques used in civil engineering, in the building industry and more particularly in drilling oil wells or the like. More precisely, the invention relates to very low density cementing compositions.

There are many applications for which a light cement would be appropriate. In the civil engineering and building industries, a low density cement could enable less bulky understructures to be produced which would not need to be reinforced to support the weight of the cement. However, the properties of currently available light cements are generally poorer, in particular as regards compressive strength, and the permeability is too high and thus they can only rarely be substituted for ordinary cement, particularly in respect of guaranteeing the work for the desired service life.

In oil wells, choosing a slurry density depends on a number of criteria. The main purpose of the cement placed between the casing and the well wall is to isolate the different geological layers which are traversed and to strengthen the casing mechanically. The cement also protects the steel of the casing from corrosion, by passivating it. In order to avoid any risk of a blow-out, the density of the cement must be adjusted so that the pressure at the bottom of the well is at least equal to the pore pressure in the geological formations traversed. Clearly, the longer the column, the less dense the cement slurry needs to be.

In addition to this lower limit, there is an upper limit on the density. The pressure exerted on the rock (due to the hydrostatic pressure generated by the cement column and to the pressure drop associated with the circulation of fluid during pumping) must be lower than the pressure which that rock can tolerate without fracturing. That pressure increases with the length of the cement column. In general, the length of the cemented section will thus be limited by the density of the cement slurry which could be used.

Since the cement must have a minimum density in order to have acceptable mechanical properties, the length of the cemented section is very often limited by the fracturing pressure if it is not limited for other reasons such as pressure inversions between geological layers. Each new section must be drilled with a smaller diameter than the preceding section to enable the drilling tool and the casing to be lowered through sections already provided with a casing; a section which was too narrow to accommodate the completion tools would be useless. For this reason, if the number of sections is high, drilling must be commenced using large diameter sections at the top of the well, resulting in high extra costs due to an increase in the volume of rock to be drilled and to the greater weight of the casing sections because of their larger diameter. It is, of course, known to cement a section in a plurality of steps to prevent the well from contracting. That technique involves high supplemental costs and the equipment required for multi-stage cementing is often not very reliable.

A reduced density cement would thus be desirable, to increase the length of each section while keeping the mechanical properties of the set cement sufficient to ensure long-term isolation.

The present invention provides particularly light cementing formulations with good mechanical, impermeability, and adhesive properties.

For oil well cements, the technique most frequently used to reduce the density of a cement slurry consists of adding a larger quantity of water and extenders which are intended to prevent particles from separating out and/or to prevent the formation of free water on the slurry surface. Such a technique greatly reduces the compressive strength of the cement, increases its permeability and reduces the ability of the cement to adhere to supports. For those reasons, the technique cannot be used to produce densities less than of the order of 1300 kg/m$^3$ and keep the geological layers isolated, as well as provide a sufficient casing strength.

A further routine technique for lightening a cement consists of formulating a slurry containing a surfactant, and introducing a gas such as air or nitrogen into the cement before it sets. The quantity of gas added is such that the required density is obtained. The quantity can be such that foamed cements are formed. A "foam quality" can be defined for such systems as the ratio of the volume of gas to the volume of foamed product, also the "swell" as the ratio of the increase in volume due to foaming to the volume of the foam. That technique is a little less powerful than the previous technique, as the density of gas is lower than that of water and thus less has to be added. However, the density is in practice limited to densities of over 1100 kg/m$^3$ in oil industry applications even when starting from a slurry which has previously been lightened with water. Above a certain "foam quality", the stability of the foam decreases very rapidly, the compressive strength of the set foam becomes too low and its permeability becomes too high which compromises its service life in hot aqueous media including ions which are aggressive towards the cement to a greater or lesser extent. In this regard, United States patent U.S. Pat. No. 5,696,059 should be consulted, as it discloses a foamed cement with a density of 1170 kg/m$^3$, obtained with a foam quality in the range 30% to 35% and which, after 24 hours, has a compressive strength of only 4.2 MPa (607 psi) while the setting temperature is over 100° C. and the system comprises a micro-cement and silica.

BRIEF SUMMARY OF THE INVENTION

Very light, excellent quality foams are obtained by strongly foaming dense slurries before injecting them into the wells, said slurries with a very low water content to produce good mechanical performance and very low permeability, contrary to current practice and to that which at first sight appears to be more rational, namely using slurries which are already of low density, extended with water. These denser slurries support higher "foaming qualities" while forming stable foams. Finally, for an identical foam density, the mechanical properties of the foam of the invention are better, with lower permeability, and the ability of the cement to adhere to the casing and to geological formations is improved.

In a first variation of the invention carried out with slurries based on ordinary cement, before foaming, the initial slurry must comprise a surfactant to stabilize the foam and is characterized by a low water content: in general, the initial water content must not exceed 50% by volume of the non foamed slurry, and is preferably less than 45%, more preferably about 40%. In some cases, the water content can be reduced again but in general, a slurry with a water content of less than 33% is not used as it then becomes very difficult to obtain the correct rheology. The fluid portion of the additives, when they are liquid, or solid additives which are soluble, are counted as part of the liquid volume along with the mixing water In contrast, if liquid additives comprise insoluble particles in suspension, the volume of those particles is counted as part of the other solids.

The term "ordinary cement" means a cement with an average particle diameter which is in general close to 20 μm, with a maximum particle size which can reach 100 μm and a specific surface area per unit weight, determined by the air permeability test [Blaine Fineness] typically in the range 0.2 $m^2/g$ to 0.4 $m^2/g$. All commercially available Portland cements for oil well applications (categories A to H) can be used, but class G cements are preferred in the present invention.

DETAILED DESCRIPTION OF THE INVENTION

The aim of a low water content combined with good rheology can be achieved by adding coarse particles; the term "coarse particles" means particles with a size typically in the range 5 to 50 times the size of the ordinary Portland cement used in oil well cements, or in other words particles with a size in the range 100 μm to 1 mm. Such coarse particles are preferably light particles, such as hollow spheres or particles produced from a plastics or elastic material. However, to obtain a foam with a density of more than 900 $kg/m^3$, for reasons of economy and better compressive strength, it is possible to use solid coarse particles with sub-millimeter dimensions composed, for example, of silica or carbonates of natural lime or any other low solubility mineral product, which may or may not be reactive in the water of the slurry.

High performance dense slurries with a reduced water content which nevertheless have sufficient fluidity to be pumped without an excessive pressure drop are preferably obtained as described in European patent EP-A-621 247 or PCT application PCT/FR98/02429 which, in addition to cement, comprise a group of "coarse" particles with a typical diameter in the range 200 μm to 800 μm, and a group of "fine" particles, with a typical diameter in the range 0.5 μm to 5 μm, and optionally other coarser or finer groups of particles, each group of particles having a range of grain sizes which is distinct from the other groups, with an average particle diameter differing by a factor of 5 to 20, and the respective proportions of the particles from the different groups being such that the compactness of the mixture is a maximum or at least close to its theoretical maximum.

Typically, the solid fraction of such a reduced water content slurry will be constituted by 35% to 65% (by volume) of coarse particles, 20% to 45% of Portland cement, and 5% to 25% of micronic particles. In a more particularly preferred variation, the solid fraction will be constituted by 55% fine sand with an average size of 300 μm, 35% Portland cement, and 10% fine silica.

It is also possible to start from multi-modal slurries analogous to those described in EP-A-621 247, dispensing with the particles with a size which exceeds the cement particles, the function of the "coarse" particles being carried out by the bubbles in the foam.

In a second variation of the invention, the dense slurries are preferably obtained as described in EP-A0 748 782 or French patent application FR-98 15570. These slurries, which are particularly suitable for squeeze operations, for plugging or for strengthening poorly consolidated geological formations, are based on a micro-cement and not on an ordinary cement.

The term "micro-cement" means a cement with a maximum particle size in the range 6 μm to 12 μm, preferably in the range 8 μm to 11 μm, with a mean particle diameter of a few microns, typically 4 μm for the commercially available micro-cements tested, and a specific surface area per unit weight, determined by the air permeability test [Blaine Fineness] of more than 0.6 $m^2/g$, preferably more than 0.7 $m^2/g$, and more preferably close to 0.8000 $m^2/g$.

The majority of oil industry applications using a micro-cement use compounds formed from slag which comprises 45% lime, 30% silica, 10% alumina, 1% iron oxides, and 5%–6% manganese oxide (only the principal oxides are mentioned here; these amounts can, of course, vary slightly depending on the supplier). Micro-cements with a composition which is that of a Class G Portland cement are also commercially available; they typically comprise about 65% lime, 22% silica, 4% alumina, 4% iron oxides, and less than 1% manganese oxide. The two types of materials, or mixtures of the two, can be used in this second variation of the invention.

For slurries based on micro-cement, the quantity of water used is necessarily higher than for a slurry based on an ordinary cement. Thus for the slurries of the invention, the volume of water will be less than 72%, preferably in the range 58% to 70%. Clearly, a surfactant can also be added to stabilize the foam. This water content is significantly higher than in the case of a slurry based on ordinary cement but the volume of liquid is nevertheless remarkably low if it is compared with that normally used for slurries based on microcement normally used for squeeze operations, in particular for injecting into cracks, and which has a water content of more than 75% (the quantity of water added being a minimum of 100% with respect to the weight of cement), and usually close to 80% by volume. This constitutes the inventive step of the invention, namely foaming a "dense" slurry.

For slurries based on a microcement, prepared as described in European patent application EP-A-0 748 782 or in French patent application FR-98 15570 (density 1650 $kg/m^3$ to 1800 $kg/m^3$, compared with 1400 $kg/m^3$ for conventional squeezing slurries), in addition to the points described above, the foam has the advantage of not penetrating into very porous media such as reservoir rocks. Most surprisingly, the authors of the present invention have found that despite a higher yield point because of the foaming, these foams have a much greater ability to penetrate into porous fissures compared with conventional non foamed squeeze slurries, and only very slightly smaller than the non foamed slurries described in patent applications EP-A-621 247 and FR-98 15570.

Such slurries are constituted by an aqueous based fluid, a dispersing agent in solution in the aqueous phase and optional other liquid additives, a micro-cement, i.e., a cement constituted by particles with micronic sizes, and a first additive constituted by particles 5 to 100 times, preferably of the order of 10 times smaller than micro-cement particles. Typically, the average particle diameter is thus in the range 0.05 to 0.5 micrometers such as a latex, a silica smoke type silica condensate, a condensate of oxides of manganese in pigment smoke, certain fine soots, carbon black or certain microgels of polymers such as a fluid loss control agent; and optionally, a second additive constituted by ultra-fine particles, 5 to 100 times, preferably of the order of 10 times smaller than the particles of the first additive, such as dispersed colloidal silicas or aluminas (average dimension 3–60 nonometers, preferably 15–40 nonometers) or a nanolatex.

The preferred compositions known from EP-A-621 247 advantageously comprise 10% to 40% of the first additive and 5% to 30% of "ultra-fine" particles, the percentages being indicated with respect to the total volume of solid particles in the composition. More particularly preferred are compositions comprising 50% to 75% micro-cement, 15% to 40% "very fine" particles, and 5% to 20% "ultra-fine" particles.

The preferred compositions known from FR-98 15570 comprise an aqueous phase, a microcement, and an aqueous suspension comprising a vinyl acetate type polymer obtained by chemically cross-linking, in a reaction with controlled stirring, a polyvinyl compound (PVA) in solution with bi- or polyfunctional cross-linking agents which cross-link the alcohol groups (primary, secondary or tertiary), the molar concentration of said cross-linking agent with respect to the PVA monomer residues being in the range 0.1% to 0.5%, a nanolatex, and an anionic surfactant with a cloud point of more than 80° C.

Whatever the variation, it should be noted that the presence of very fine particles, as described in the above patents, contributes to stabilizing the foam and can achieve higher "qualities" than with conventional foaming additives and foam stabilization additives. It is also possible to start from slurries produced by a suspension of solid particles (mineral particles, cements, micro-cements, organic particles such as latexes or polymer microgels), for which the graph of the size distribution of the particle mixture showing the logarithm of the cumulative frequency of the particles as a function of the logarithm of the particle size is substantially linear provided that they contain micronic particles, although they are less preferred than the preceding compounds because the "compactness" of the solid fraction is lower, i.e., the minimum volume occupied by the solid fraction of the slurry is higher than in the preceding case, which means that a larger quantity of water is used.

Thus foams with a density of less than 660 kg/m$^3$ can be obtained which have mechanical properties, impermeability properties and adhesion properties suitable for oil industry applications. The heat insulation properties of these foams with a very high foaming "quality" is also much improved because of the larger incorporation of gas (air or nitrogen being generally preferred because of the greater ease of use on the terrain, and the cost) as well as greatly reduced heat release during setting due to the small quantity of cement and to dilution by the gas, a particularly advantageous phenomenon when cementing in permafrost type zones. The good heat insulation qualities are also advantageous in the case of very deep wells, in particular when the sections of the well which are closest to the surface have not been cemented with cements comprising silica and must nevertheless tolerate a crude circulating at a high temperature.

Known surfactants are added to form and stabilize the cement foams. Other additives can be added, such as any of the normal cements, mortars and concrete additives, except, of course, for anti-foaming additives. Examples are dispersing agents (also known as superplasticizers), antigelling agents, water retainers, retarders (intended to control the setting time at temperatures of more than 60° C.) or accelerators (intended to control the setting time at low temperatures).

The techniques for producing the foam, which are also well known, do not form part of the invention as claimed. Existing techniques are used. The "quality" of the foam is adjusted as a function of the density of the starting slurry to obtain the desired foam density. However, the quality of the foam should not exceed 65%, above which limit the stability of the foam and its properties rapidly degrades, becoming too low (compressive strength, impermeability). The conditions for operating the apparatus for generating the foam and the quantity of surfactant are adjusted so that the bubble size does not exceed 7 millimeters, preferably 3 millimeters.

The present invention is illustrated by the following examples.

EXAMPLE 1

The properties of four slurries were compared.

Slurry A (in accordance with the invention): A mixture of powders was prepared, comprising 55% by volume fine sand with an average size of 300 microns, 35% by volume Class G Portland cement, and 10% by volume fine silica with an average size of 3 microns. Water and additives (retarder based on purified lignosulfonates (D801, sold by Schlumberger Dowell) in an amount of 4.5 ml/kg of solid mixture (0.05 gallons per sack of mixture, i.e., 3.785 liters per sack of 42.637 kg of mixture, in other words, 1 gps=0.0888 liters of additive per kg of mixture), AMPS polymer based water retainer (D158, sold by Schlumberger Dowell) in an amount of 13.3 mi/kg of solid mixture (0.15 gps) and a polynaphthalenesulfonate based superplasticizer (D80, sold by Schlumberger Dowell) in an amount of 1.8 ml/kg of solid mixture (0.02 gps) were mixed with this powder so that the percentage volume of liquid in the slurry was 40%.

The density of this slurry was 2115 kg/m3 (17.6 pounds per gallon). The rheology of a slurry is characterized by its plastic viscosity PV (in cP or mPa.s, the conversion factor being 1) and the yield point Ty (in pounds per 100 square feet, lbf/100 ft$^2$), conversion to Pascals being made by multiplying by 0.478803), assuming that the slurry was a Bingham fluid. For slurry A, the yield point was 5.3 Pa or 11 lbf/100 ft$^2$ and the plastic viscosity was 159 mPa.s. The thickening time at 85° C was 5 hours 40 minutes. There was neither free water nor sedimentation using standard API tests (American Petroleum Institute).

Slurry B (in accordance with the invention): A mixture of powders was prepared. It comprised 55% by volume hollow spheres from cenospheres with an average size of 170 microns, 35% by volume Class G Portland cement, and 10% by volume fine silica with an average size of 3 microns. Water and additives (AMPS polymer based water retainer (D159, sold by Schlumberger Dowell) in an amount of 8 ml/kg of mixture (0.09 gps) and a polynaphthalenesulfonate based superplasticizer (D80) in an amount of 4.5 ml/kg of mixture (0.05 gps) were mixed with this powder so that the percentage volume of liquid in the slurry was 40%.

The density of this slurry was 1465 kg/m$^3$ (12.2 pounds per gallon). There was neither free water nor sedimentation using standard API tests.

Slurry C (comparative example): This Example corresponded to current technology for medium densities. Water and additives (retarder based on purified lignosulfates (D801) in an amount of 4.5 ml/kg of cement (0.05 gallons per sack of cement), AMPS polymer based water retainer (D158) in an amount of 13.5 ml/kg of mixture (0.15 gps) and a polynaphthalenesulfonate based superplasticizer (D80) in an amount of 1.78 ml/kg of mixture (0.02 gps)) were mixed with class G Portland cement so that the density of this slurry was 1900 kg/m$^3$ (15.8 pounds per gallon), i.e., a 58% by volume liquid fraction.

Slurry D (comparative example): This slurry corresponded to the current technology for low densities. A mixture of powders was prepared. It comprised a class G cement with added bentonite constituting 10% by weight of cement. Water was added to the above mixture of powders such that the density of the slurry was 1575 kg/m$^3$ (13.1 pounds per gallon), i.e., a 73.8% by volume liquid fraction.

To foam these slurries, conventional surfactants sold by Schlumberger Dowell under reference D139 (an aqueous solution of alkoxylates, methanol and polyglycols) and F052.1 (a surfactant based on ethanol, propylene glycol and fatty alcohol sulfate ammonium salts) were added in proportions of 1:1. The quantity depended on the quality of the foam. More was added to obtain a higher foaming quality. 7.46 ml per kg of solid mixture (0.084 gallons per sack of solid mixture) was used to obtain a 50% foam quality.

|  |  | Densities | | | | |
| --- | --- | --- | --- | --- | --- | --- |
|  |  | 1200 (10) | 1080 (9) | 960 (8) | 840 (7) | 720 (6) |
| Slurry A | Q | 43% | 49% | 55% | | |
|  | CS | 27.6 (4000) | 24 (3500) | 20.6 (3000) | | |
|  | P | 0.8 | 1 | 1.5 | | |
| Slurry B | Q | | | 35% | 43% | 51% |
|  | CS | | | 16 (2300) | 13.5 (2000) | 11 (1600) |
|  | P | | | 1.2 | 1.6 | 2.4 |
| Slurry C | Q | 37% | | | | |
|  | CS | 20 (2900) | | | | |
|  | P | 6 | | | | |
| Slurry D | Q | | 31% | 39% | | |
|  | CS | | 5.5 (800) | 4.8 (700) | | |
|  | P | | 50 | 70 | | |

The densities are expressed in kg/m$^3$ with pounds per gallon in parentheses. Q designates the quality of the foam, expressed in % by volume. CS designates the compressive strength after 24 hours of setting, expressed in megaPascals, with psi in parentheses. P designates the permeability of the set cement, expressed in microDarcy.

It can be seen that for the foamed slurries of the present invention, the compressive strength was substantially higher and the permeability was considerably lower than for conventional foamed slurries with an equal slurry density.

EXAMPLE 2

In this Example, sub-micronic particles were introduced into the slurry, in this case latex type particles containing 50% by volume of particles of 150 nonometers in suspension in water. It should be noted that the latex can be replaced by mineral particles (silica smoke or pigment smoke in suspension) or constituted by microgels of a cross-linked polymer as described in patent EP-A-0 705 850 or International application WO 98/35918.

Slurry F: The mixture of powders was exactly the same as for slurry A. Water, latex in an amount of 0.4 gallons per sack of mixture, and additives (retarder based on purified lignosulfonates (D800) in an amount of 0.15% by weight with respect to the solid mixture and a polynaphthalene-sulfonate based superplasticizer (D80) in an amount of 0.12% by weight with respect to the solid mixture) were mixed with this powder so that the percentage volume of liquid in the slurry was 40%.

The density of this slurry was 2090 kg/m$^3$ (17.4 pounds per gallon). Its rheology was as follows: yield point 31 pounds per square feet and plastic viscosity 68 centiPoises, using a Bingham fluid model. The thickening time at 102° C. was 4 hours 00 minutes. There was neither free water nor sedimentation using the standard API tests.

|  |  | Densities | | |
| --- | --- | --- | --- | --- |
|  |  | 1320 (11) | 1080 (9) | 960 (8) |
| Slurry E (invention) | Q | 35% | 49% | 55% |
|  | CS | 17.2 (2500) | 13.1 (1900) | 11 (1600) |
|  | P | 0.2 | 0.3 | 0.5 |

The units and symbols are the same as those used above.

It can be seen that the compressive strength was a little lower than in Example 1, but still highly acceptable. In contrast, the permeability was substantially lower, which is advantageous as regards the resistance of the cement to chemical attack by fluids, for example subterranean water, or acidic treatments carried out during the well lifetime to increase overall production.

EXAMPLE 3

In this Example, the base slurry corresponded to a composition as described in previous patents more particularly adapted to very low temperature cementing, which nevertheless requires a reduced thickening time, and rapid development of compressive strength.

Slurry F: The composition of the mixture of powders was the same as for slurry B, with the exception that the fine silica was replaced by the same quantity by volume of Dyckerhoff Mikrodur PU micro-cement, namely 10% by volume. Water, cross linked polymer microgels in an amount of 0.1 gallons per sack of mixture and additives (a super-plasticizer based on polymelaminesulfonate (D145A) in an amount of 0.15 gallons per sack of solid mixture) were mixed with this powder so that the percentage volume of liquid in the slurry was 42%.

The slurry density was 1480 kg/m$^3$ (12.3 pounds per gallon). The thickening time at 10° C. was 5 h 20 min. There was no free water nor sedimentation using the standard API tests.

|  | Densities | | |
| --- | --- | --- | --- |
|  | 960 (8) | 745 (6.2) | 660 (5.5) |
| Q | 35% | 50% | 55% |
| CS at 24 h | 5.2 (760) | 3.9 (560) | 3.5 (500) |
| CS at 48 h | 12.1 (1760) | 9.0 (1300) | 7.9 (1150) |
| CS at 89 h | 15 (2200) | 11 (1600) | 9.6 (1400) |
| P | 0.3 | 0.6 | 0.7 |

The units and symbols were the same as those used as in the preceding example. The compressive strength was recorded at 24 hours, 48 hours and 89 hours. The strength measurements were carried out at 10° C.

The compressive strength development was much slower than in the preceding examples. This was due to the very low temperature which reduced the hydration rate of the cement and to the extremely low densities of the cement.

These slurries are particularly suitable for very deep water cementing where the temperature is very low and the geological sea floor formations are highly unstable. The density of the cement for very deep water drilling must be even lower than for other wells, since the depth of the sea floor means that there is a great depth of cement slurry in the casing and thus the pressure exerted on the bottom on poorly consolidated formations is high. It can be seen that despite everything, the compressive strength after 24 hours was acceptable, meaning that the drilling tool could be re-inserted, and the strength continued to develop to values which would guarantee good support. It can also be seen that the permeabilities were very low.

EXAMPLE 4

In this Example, the powder composition of slurry G was identical to that of slurry F. The organic additives were different since it was subjected to a temperature of 143° C. to put it under conditions comparable to those of U.S. Pat. No. 5,696,059 of Example 2, termed U.S. '059 in the Table.

Slurry G: The composition of the powder mixture was the same as for slurry F. A polynaphthalenesulfonate dispersing agent in an amount of 0.01 gallons per sack of solid mixture and a cement setting retarder, D161, in an amount of 0.6 gallons per sack of solid mixture were added. The retarder was added to control cement setting at 143° C. The surfactants used to produce the foam were the same as those in all of the preceding examples.

|  | Quality | | |
| --- | --- | --- | --- |
|  | 0% | 35% | 50% |
| Slurry F (invention) | | | |
| Density | 2080 (17.4) | 1350 (11.3) | 1040 (8.7) |
| Thickening time at 260° F. | 5 h 24 | | |
| Rheology Ty(lbf/100 ft$^2$)/Pv (cP) | 23/87 | | |
| CS at 24 h at 290° F. | 60 (8800) | 30 (4400) | 22 (3200) |
| Slurry of US'059 | | | |
| Density | 1800 (15) | 1170 (9.8) | |
| Thickening time at 260° F. | 6 h 14 | | |
| Rheology Ty(lbf/100 ft$^2$)/Pv (cP) | 114/92 | | |
| CS at 24 h at 290° F. | | 4.2 (607) | |

The units and symbols were the same as those used in the preceding Example.

It can be seen that the rheology of non foamed slurry F was substantially lower than that of the U.S. '059 slurry, even though the density was higher. The compressive strength after 24 hours for slurry F was much higher than that of the U.S. '059 slurry, even though the comparison was made with an identical foam quality or the same foam density. In particular, the compressive strength after 24 hours of 50% foamed slurry F should be compared with that of the U.S. '059 slurry. It was substantially higher even though the density was lower, 1040 kg/m$^3$ as opposed to 1170 kg/m$^3$.

EXAMPLE 5

This Example covered applications with no particles coarser than the cement in the slurry. The foam bubbles acted in their stead. For the Example, we selected a slurry produced in accordance with EP-A-621 247.

Slurry H: The cement used was a Spinor A12 microcement. 2.4 gallons per sack of cement was added to an additive in accordance with FR-98 15570. A polymelamine-sulfonate (PMS) based dispersing agent, D145A, was added in an amount of 0.52 gallons per sack of cement The additives used to foam the slurry and stabilize the foam were as those described in all of the preceding examples, D139 and F052.1, which were each added in an amount of 0.1 gallons per sack of cement. The foaming quality was 43%.

|  | Quality | |
| --- | --- | --- |
|  | 0% | 43% |
| Slurry H (invention) | | |
| Density | 1690 (14.1) | 960 (8) |
| Rheology Ty(lbf/100 ft$^2$)/Pv(mPa.s) | 2.6/44.2 | — |
| Thickening time at 170° F. | 5 h | — |
| CS at 24 h | — | 4.1 (600) |

The units and symbols were the same as those used in the preceding Example.

This type of slurry was intended, inter alia, for squeezing, blocking cracks, filling volumes with a very small opening for injection, and plugging porous walls to hold gels in place in the porous medium. With non foamed slurries, which had an astonishing penetrating ability even in a permeable medium, in certain cases it may be feared that they would also penetrate into the porous geological formation if the permeability exceeded 1 Darcy, and would damage it. Foams are known to considerably reduce penetration into pores because of their high yield point. It could thus be feared that penetration into permeable cracks would also be reduced. We used the apparatus described in EP-A-621 247 to check this point. Most surprisingly, penetration was excellent. The foam advanced the whole length (23 cm) of a 150 μm slot to exit at the other end of the slot. The foam was still well expanded at the outlet from the slot and thus exerted a pressure on the walls. This phenomenon is extremely important for ensuring an excellent seal.

What is claimed is:

1. A method of cementing an oil well or the like, comprising:
 a) forming a cement slurry comprising:
  i) a solid fraction constituted by
   35% to 65% by volume particles with an average diameter in the range 200 μm to 600 μm,
   20% to 45% by volume ordinary Portland cement, and
   5% to 25% by volume particles with an average diameter in the range 0.5 μm to 5 μm;
  ii) a surfactant; and
  iii) water, the water content of the slurry being less than 50% by volume of the slurry;
 b) foaming the slurry by introduction of gas; and
 c) injecting the slurry into the well and allowing it to set;
 characterized in that the water content of the slurry is less than 50% by volume before foaming.

2. The method of claim 1, whereby the water content of the slurry is of 33% to 45% by volume.

3. The method of claim 1, comprising introducing gas to the slurry such that the foaming quality is in the range 30% to 65%.

4. The method of claim 1, comprising including in the slurry one or more additives of the following types: a dispersing agent, an antigelling agent, a water retainer, a cement setting accelerator or retarder, or a de-foaming stabilizer.

5. The method of claim 1, whereby the step of foaming is carried out so that the gas bubble size is less than 7 millimeters.

6. The method of claim, 5, whereby the step of foaming is carried out so that the gas bubble size is less than 3 millimeters.

7. A method of cementing an oil well or the like, comprising:
   a) forming a cement slurry comprising:
      i) a solid fraction constituted by
         50% to 75% by volume micro-cement having a maximum particle size in the range 6 μm to 12 μm, and a specific surface area per unit weight, determined by the air permeability test of more than 0.6 m$^2$/g,
         15% to 40% by volume particles with an average diameter in the range 0.05 micrometers to 0.5 micrometers, and
         0 to 20% by volume particles with an average dimension in the range 3 nanometers to 60 nanometers:.
      ii) a surfactant; and
      iii) water; the water content of the slurry being less than 72% by volume of the slurry;
   b) foaming the slurry by introduction of gas; and
   c) injecting the slurry into the well and allowing it to set.

8. The method of claim 7, comprising forming a slurry having a water content before foaming in the range 58% to 070% by volume.

9. The method of claim 7, comprising introducing gas to the slurry such that the foaming quality is in the range 30% to 65%.

10. The method of claim 7, comprising including in the slurry one or more additives of the following types: a dispersing agent, an antigelling agent, a water retainer, a cement setting accelerator or retarder, or a defoaming stabilizer.

11. The method of claim, 7, whereby the step of foaming is carried out so that the gas bubble size is less than 7 millimeters.

12. The method of claim 11, whereby the step of foaming is carried out so that the gas bubble size is less than 3 millimeters.

* * * * *